Figure 5:
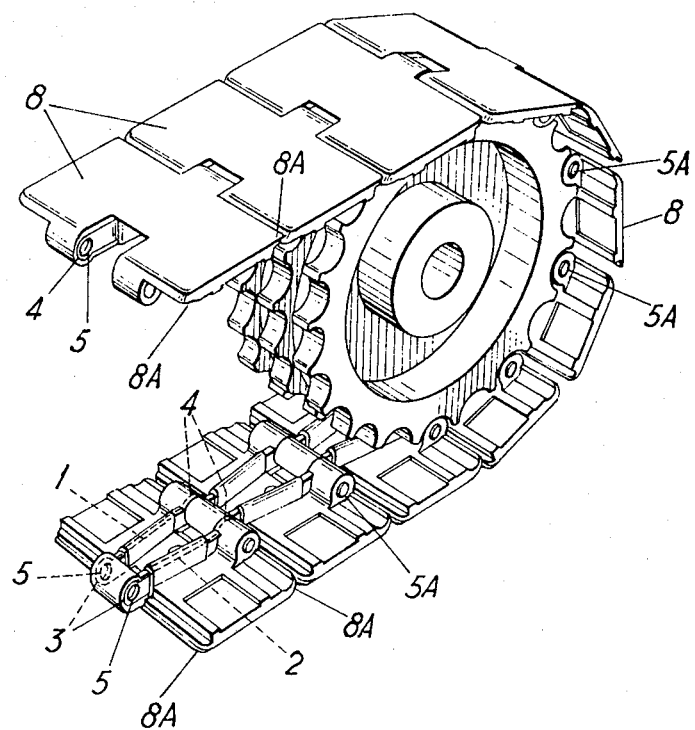

United States Patent

Collins

[15] 3,672,488

[45] June 27, 1972

[54] CONVEYORS

[72] Inventor: Bernard Collins, Stanmore, England

[73] Assignee: Bernard Collins Limited, Borehamwood, Hertfordshire, England

[22] Filed: Nov. 20, 1970

[21] Appl. No.: 91,435

[52] U.S. Cl. .......................................................... 198/189
[51] Int. Cl. .................................................... B65g 17/00
[58] Field of Search ....................... 198/189, 195; 59/78, 91

[56] References Cited

UNITED STATES PATENTS 3,188,795   6/1965   Ulan ........................................ 59/91

FOREIGN PATENTS OR APPLICATIONS 842,230   7/1960   Great Britain ....................... 198/189

*Primary Examiner*—Richard E. Aegerter
*Assistant Examiner*—Douglas D. Watts
*Attorney*—Allison C. Collard

[57] ABSTRACT

This invention relates to endless or continuous link conveyors having a series of platforms or supports linked to each other. The links in the present invention are fundamentally metal embedded within plastics materials, the exposed surfaces of the platform or support being of plastics material.

6 Claims, 5 Drawing Figures

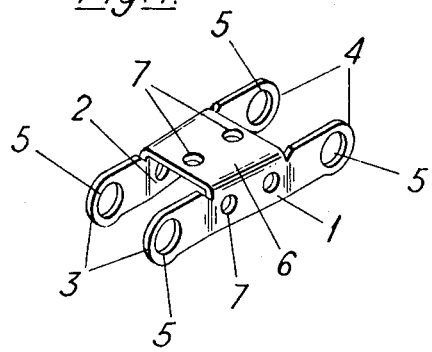
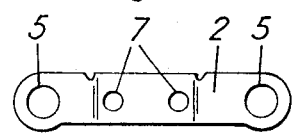
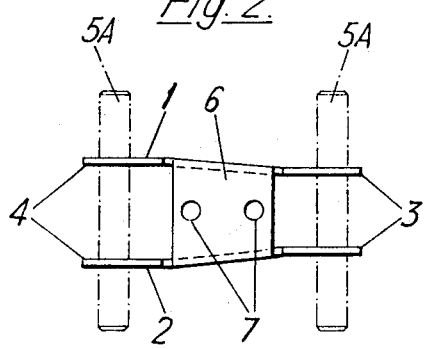
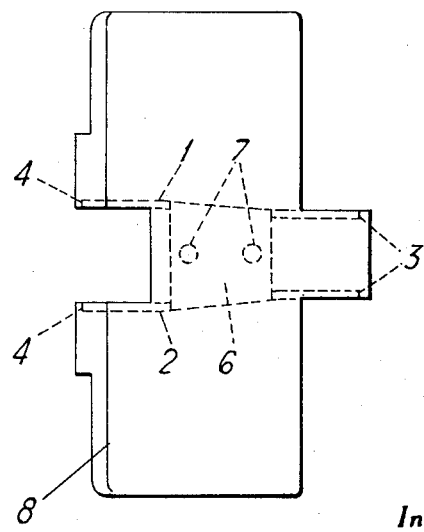
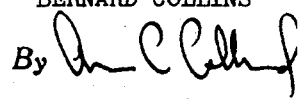

Inventor
BERNARD COLLINS
By [signature]
Attorney

CONVEYORS

This invention relates to conveyors and particularly to continuous link conveyors.

Continuous link conveyors are known which consist of a series of platforms made from plastics materials generally hinged together to make up an endless chain and arranged for travelling over two or more sprockets or pulleys. It has been found that when used for conveying glass bottles or metal cans it happens that broken glass or metal falls between the platforms and the plastics material becomes damaged or broken. Metal platforms and links have been used but these are not always entirely satisfactory.

The present invention resides primarily in a metal conveyor link which supports an individual platform made of plastics material in which plastics material the said metallic link is substantially entirely embedded. The invention also includes an endless conveyor link having a platform of plastics material reinforced with metal reinforcement located so as to support the central area of the platform and having means for pivotal connection with neighboring links.

A conveyor constructed according to the invention may be found to be quieter in operation than existing types; moreover it is fundamentally of lighter construction for a given duty and may consequently be larger and require less power and be operated faster.

Provision is made for pivotal interconnection between identical links and may consist of projections of one link overlapping complementary projections of another, a first rod passing through holes in the respective projections.

The link may be so shaped that in operation a driving sprocket or pulley can engage the undersides of the links.

The invention also includes an endless chain conveyor made up of a number of pivotally interconnected metal links each being embedded in plastics material and each link supporting a platform of the material. Further features of the invention are defined in the claims.

A preferred form of the invention is illustrated in the accompanying drawings in which:

FIG. 1 is a perspective view of a link before it is embedded;
FIG. 2 is a plan view of the link;
FIG. 3 is a side elevation of the link;
FIG. 4 represents a plan view of the platform showing in broken lines a plan view of the embedded link; and
FIG. 5 represents diagrammatically the chain conveyor (including the platforms) passing around a standard form of periphery grooved driving sprocket.

Referring to FIGS. 1 to 3, the link is made from metal (preferably stainless steel) pressed into the shape shown. The link has two sides 1 and 2 which are arranged to be wider apart at one end than the other as shown clearly in FIG. 2, so that the ends 3 of the sides 1 and 2 are closer to each other than the ends 4 so that by virtue of which one end of each link is complementary to one end of another for the purposes of interattachment. The sides 1 and 2 have holes 5 at their ends, through which can be passed a rod 5A (see FIG. 2 in dotted line) constituting a pivotal interattachment to form a chain. The two side pieces 1, 2, are bridged by a flat top 6. Holes such as 7 may be drilled in the links for the purpose of assisting in the keying of embedding plastics material which is to form a platform and for holding the link in the right position during moulding. The plastics platform is more clearly shown in FIG. 4 by the reference 8. The flat top 6 of the link as shown in FIGS. 1 to 3 is actually embedded in the central part of the platform 8 so as to be capable of directly supporting what is usually the main load-carrying part of the platform. This is shown in FIG. 4. The relative sizes of the platform and the link may be varied. In practice the plastics platform 8 is moulded in split or in two pad mould with the metal link held in position.

In the manner shown in FIG. 5 a number of links each with its platform are pivotally interconnected so as to form an endless chain. The adjacent edges of the platforms may be undercut or overcut as at 8A so that they may overlap each other.

The link is adapted to fit a standard type of driving sprocket as used in this type of conveyor, i.e., one having two peripherial grooves as seen in FIG. 5. The shape of the underneath of the link as shown assists in making the platform as a whole self-centering.

It may be convenient for the adjacent edges of the platforms to be formed with rebates as at 'A so that the platforms may overlap each other in operation while allowing flexibility of the chain as a whole for passing round the pulleys or sprockets. The holes 5 and their rods 5A preferably constitute metal-to-metal pivotal bearings.

The term "plastics" is applied herein to moldable materials of plastics nature and may include say glass fiber reinforced nylon.

It has been found that the present invention offers high speed conveyor operation, and provides a low friction platform surface. This is a particular advantage should goods on the conveyor be stopped while the conveyor continues to move.

Various modifications may be made without departing from the invention. The actual shape of the links may be varied from that shown in FIGS. 1 to 3. For instance, the sides may be parallel to each other and the projecting ends cranked and perforated to form complementary pivotal connections. The flanking surfaces of the ends 4 and 5 bear against each other and thus act as thrust bearings meeting lateral loads.

A plurality of parallel chains of links may support a single series of platforms.

The holes 5 may be somewhat oval or elongated in the direction of running, so as to permit the conveyor to adapt itself to a curved path, appropriate allowance for this will then be made in the dimensions of the mouldings.

The platforms may be formed with projections or flights to accommodate different loads to operate on inclines, etc. The metal reinforcements may have corresponding formation.

I claim:

1. An endless conveyor chain link, comprising:
   a U-shaped, metallic member, tapered longitudinally so that the width of said member is greater at one end than at the other, the sides of said U-shaped member extending outwardly parallel to the longitudinal axis of said member and having co-axial apertures provided in their ends to receive a pivot pin for linking a plurality of members together, the ends of said sides of said member being spaced closer together at one end than the ends of said sides at the other end of said member so that one end of said member may interengage with the corresponding end of an opposite adjoining member; and
   a platform, comprising a molded envelope of plastic material enclosing the length of said member and extending transversely and symmetrically to each side of said member, so that said member is embedded in said molded envelope, said plastics material extending between the ends of the sides spaced closest to each other so as to form an integral reinforcement and a substantially rectangular-shaped projection from one end of the platform having a cylindrical bore co-axial with said apertures, and extending over the outer faces of the ends of the other sides of said member, forming a U-shaped recess in the platform between the ends of said sides of said U-shaped member and providing a pair of cylindrical reinforcement bores co-axial with said apertures adjacent said ends of said sides of said U-shaped member.

2. The endless conveyor chain link as recited in claim 1, wherein said sides of said member are spaced parallel to each other at each end and are disposed at an angle to said member, so that said ends interengage with corresponding opposite ends of another member, and wherein said plastic envelope between and adjacent said sides of said member containing said cylindrical bores form cylindrical members for reinforcing the ends of said member.

3. The endless conveyor chain link as recited in claim 1, wherein said plastic material is glass reinforced nylon.

4. The endless conveyor chain link as recited in claim 1, further comprising a plurality of additional U-shaped members interengaged with each other, and a plurality of pins, disposed through said apertures and said cylindrical bores provided in said sides of said members for pivotably joining said members together, so as to provide an endless chain of conveyor platforms pivotably joined together.

5. The endless conveyor chain link as recited in claim 4, wherein the edges of said platform are disposed at a predetermined inclined angle with respect to the top of said platform so that the edges of said platforms overlap adjacent ends of adjacent platforms when said members are interengaged to form an endless conveyor platform.

6. The endless conveyor chain link as recited in claim 5, further comprising means for driving the conveyor including a driving sprocket having a plurality of circumferential grooves for engaging said molded plastic cylindrical members between and adjacent said ends of said sides of said U-shaped member.

* * * * *